(12) United States Patent
Palmer (10) Patent No.: US 12,468,627 B2
(45) Date of Patent: Nov. 11, 2025

(54) ADDRESS MAPPING TABLE COMPRESSION

(71) Applicant: Micron Technology, Inc., Boise, ID (US)

(72) Inventor: David Aaron Palmer, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 98 days.

(21) Appl. No.: 18/443,005

(22) Filed: Feb. 15, 2024

(65) Prior Publication Data

US 2024/0281374 A1   Aug. 22, 2024

Related U.S. Application Data

(60) Provisional application No. 63/486,378, filed on Feb. 22, 2023.

(51) Int. Cl.
*G06F 12/06* (2006.01)
*G06F 12/02* (2006.01)

(52) U.S. Cl.
CPC ...... *G06F 12/0646* (2013.01); *G06F 12/0246* (2013.01); *G06F 12/0292* (2013.01)

(58) Field of Classification Search
CPC ............ G06F 12/0246; G06F 12/0292; G06F 12/0646; G06F 2212/7201
See application file for complete search history.

(56) References Cited

U.S. PATENT DOCUMENTS

| 2006/0174088 | A1* | 8/2006 | Justiss | G11B 27/002 711/202 |
| 2023/0350808 | A1* | 11/2023 | Wang | G06F 12/10 |
| 2024/0345949 | A1* | 10/2024 | Liu | G06F 12/0871 |

* cited by examiner

*Primary Examiner* — Aracelis Ruiz
(74) *Attorney, Agent, or Firm* — Holland & Hart LLP (57) ABSTRACT

Methods, systems, and devices for address mapping table compression are described. A memory system may identify, for a region of an address mapping table, sets of sequentially indexed logical addresses that are mapped to sets of sequentially indexed physical addresses. The memory system may select a compression factor for the region based on the sets of sequentially indexed logical addresses. And the memory system may remove subsets of physical addresses from the sets of sequentially indexed physical addresses in the region based on the compression factor.

20 Claims, 6 Drawing Sheets

ADDRESS MAPPING TABLE COMPRESSION

CROSS REFERENCE

The present Application for Patent claims the benefit of U.S. Provisional Patent Application No. 63/486,378 by PALMER, entitled "ADDRESS MAPPING TABLE COMPRESSION," filed Feb. 22, 2023, assigned to the assignee hereof, and expressly incorporated by reference in its entirety herein.

TECHNICAL FIELD

The following relates to one or more systems for memory, including address mapping table compression.

BACKGROUND

Memory devices are widely used to store information in devices such as computers, user devices, wireless communication devices, cameras, digital displays, and others. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, the memory device may read (e.g., sense, detect, retrieve, determine) states from the memory cells. To store information, the memory device may write (e.g., program, set, assign) states to the memory cells.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states if disconnected from an external power source.

DETAILED DESCRIPTION

In some systems, a host system may use logical addresses (e.g., logical block addresses (LBAs)) for various operations and a memory system may use physical addresses (e.g., physical block addresses (PBAs) for various operations. To perform address translation between logical addresses and physical addresses, a memory system may have one or more address mapping tables that include address mapping information (e.g., information that maps logical addresses and physical addresses). For example, a given entry of an address mapping table may indicate the mapping between an individual logical address and an individual physical address. That is, the translation unit (TU) size of the address mapping table may be one physical address (e.g., 1 PBA), where the translation unit size refers to the quantity of physical addresses that is associated with the entry. But associating a single logical address per entry (e.g., using a translation unit size of 1 PBA) may be inefficient, resulting in a large address mapping table size that negatively impacts performance.

According to the techniques described herein, a memory system may improve performance by increasing the translation unit size of one or more regions in an address mapping table. Put another way, the memory system may compress the address mapping table by removing physical addresses so that each entry in the address mapping table is associated with multiple physical addresses.

To do so, the memory system may identify sets of sequentially written logical addresses, where sequentially written logical addresses refer to sequentially indexed logical addresses that are mapped to sequentially indexed physical addresses. For instance, for a given region, the memory system may determine how many sets of logical addresses are written sequentially, such as: how many sets of two logical addresses are written sequentially, how many sets of four logical addresses are written sequentially, and how many sets of eight logical addresses are written sequentially, etc. The memory system may then compress the region of the address mapping table by switching to a larger translation unit size for the region based on (e.g., as a function of) the statistics of the sequentially written logical addresses. For example, the memory system may increase the translation unit size from 1 PBA to 2 PBAs by removing one physical address per set of two sequentially written logical addresses (so that the corresponding entry is associated with two physical addresses instead of one). In some examples, the memory system may perform a data relocation procedure (e.g., a garbage collection procedure, a copy/move procedure) for some of the data associated with the region so that a higher translation unit size can be selected. Thus, the memory system may compress the address mapping table so that each entry in the address mapping table is associated with multiple physical addresses for more efficient and effective mapping processes and other operations.

In addition to applicability in memory systems as described herein, techniques for address mapping table compression may be generally implemented to improve the performance of various electronic devices and systems (including artificial intelligence (AI) applications, augmented reality (AR) applications, virtual reality (VR) applications, and gaming) Some electronic device applications, including high-performance applications such as AI, AR, VR, and gaming, may be associated with relatively high processing requirements to satisfy user expectations. As such, increasing processing capabilities of the electronic devices by decreasing response times, improving power consumption, reducing complexity, increasing data throughput or access speeds, decreasing communication times, or increasing memory capacity or density, among other performance indicators, may improve user experience or appeal. Implementing the techniques described herein may improve the performance of electronic devices by facilitating more efficient and effective mapping processes and other operations, which may decrease processing or latency times, improve response times, or otherwise improve user experience, among other benefits.

Figure 1:
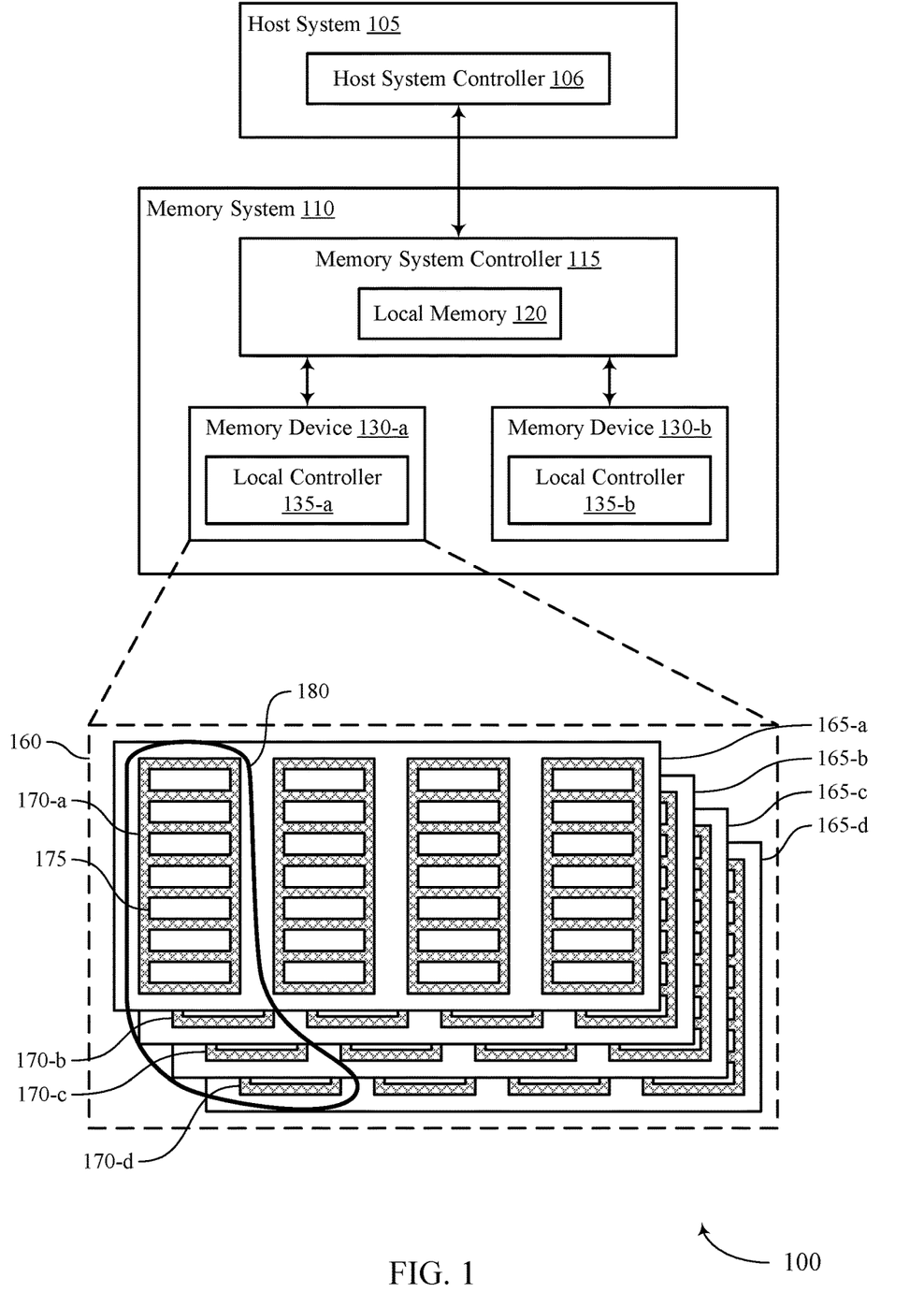
FIG. 1 illustrates an example of a system that supports address mapping table compression in accordance with examples as disclosed herein.

Features of the disclosure are initially described in the context of systems, devices, and circuits with reference to FIG. 1. Features of the disclosure are described in the context of address mapping tables and a process flow with reference to FIGS. 2 through 4. These and other features of the disclosure are further illustrated by and described in the context of an apparatus diagram and flowchart that relate to address mapping table compression with reference to FIGS. 5 through 6.

FIG. 1 illustrates an example of a system 100 that supports address mapping table compression in accordance with examples as disclosed herein. The system 100 includes a host system 105 coupled with a memory system 110. The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other devices.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with one or more memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the one or more memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the one or more memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally, or alternatively, include static random access memory (SRAM) or other memory that may be used by the memory system controller 115 for internal storage or calculations, for example, related to the functions ascribed herein to the memory system controller 115. Additionally, or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally, or alternatively, rely on an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-*a* may include a local controller 135-*a* and a memory device 130-*b* may include a local controller 135-*b*.

In some cases, a memory device 130 may be or include a NAND device (e.g., NAND flash device). A memory device 130 may be or include a die 160 (e.g., a memory die). For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally, or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170 and, in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-*a*, 170-*b*, 170-*c*, and 170-*d* that are within planes 165-*a*, 165-*b*, 165-*c*, and 165-*d*, respectively, and blocks 170-*a*, 170-*b*, 170-*c*, and 170-*d* may be collectively referred to as a virtual block 180. In some cases, a virtual block may include blocks 170 from different memory devices 130 (e.g., including blocks in one or more planes of memory device 130-*a* and memory device 130-*b*). In some cases, the blocks 170 within a virtual block may have the same block address within their respective planes 165 (e.g., block 170-*a* may be "block 0" of plane 165-*a*, block 170-*b* may be "block 0" of plane 165-*b*, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at a page level of granularity, or portion thereof) but may be erased at a second level of granularity (e.g., at a block level of granularity). That is, a page 175 may be the smallest unit of memory (e.g., set of memory cells) that may be independently programmed or read (e.g., programmed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new, valid block 170 rather than the old, invalid block 170. So, an L2P table may include address mapping information that indicates the mappings (e.g., correspondence) between logical addresses and physical addresses. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, L2P mapping tables may be maintained that allow the memory system 110 to perform address translation, where address translation refers to the conversion of logical addresses to physical addresses (and vice versa). An L2P table may also be referred to as an address mapping table or other suitable terminology In some examples, data may be marked as valid or invalid at the page level of granularity, and a page 175 may contain valid data, invalid data, or no data. Invalid data may be data that is outdated, which may be due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105). A garbage collection procedure may be an example of a data relocation procedure that moves data from one storage location (e.g., physical block) of the memory system to another storage location of the memory system.

In some examples, the address mapping table maintained by the memory system 110 may be organized according to a translation unit size of 1 PBA (e.g., each entry of the address mapping table may be associated with one physical address). But using a translation unit size of 1 PBA may result in a large address mapping table, which in turn may consume lots of memory and increase the latency associated with address translation (e.g., mapping of logical addresses to physical addresses).

According to the techniques described herein, the memory system 110 may decrease the size of an address mapping table (or increase the mapping information indicated by the address mapping table) by increasing the translation unit size used for at least one region of the address mapping table, which the memory system 110 may accomplish by compressing the at least one region of the address mapping table according to a compression factor. The compression factor for a region may indicate the quantity of physical addresses that can be removed from the region without compromising the ability of the memory system 110 to perform address translation. For example, the memory system 110 may compress a region of the address mapping table by a compression factor of z so that each entry is associated with (e.g., indicates mapping information) for z+1 as many physical addresses relative to the uncompressed region (assuming the uncompressed region has a translation unit size of 1 PBA). To identify the compression factor for a region, the memory system may determine how many sets of x logical blocks are sequentially written in the region, where x may vary, and use this information to select a translation unit size for the region.

A set of sequentially written logical addresses may refer to a set of sequentially indexed logical addresses that are mapped to sequentially indexed physical addresses. Sequentially indexed addresses may also be referred to as consecutively indexed addresses or other suitable terminology.

The system 100 may include any quantity of non-transitory computer readable media that support address mapping table compression. For example, the host system 105 (e.g., a host system controller 106), the memory system 110 (e.g., a memory system controller 115), or a memory device 130 (e.g., a local controller 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as described herein.

Figure 2:
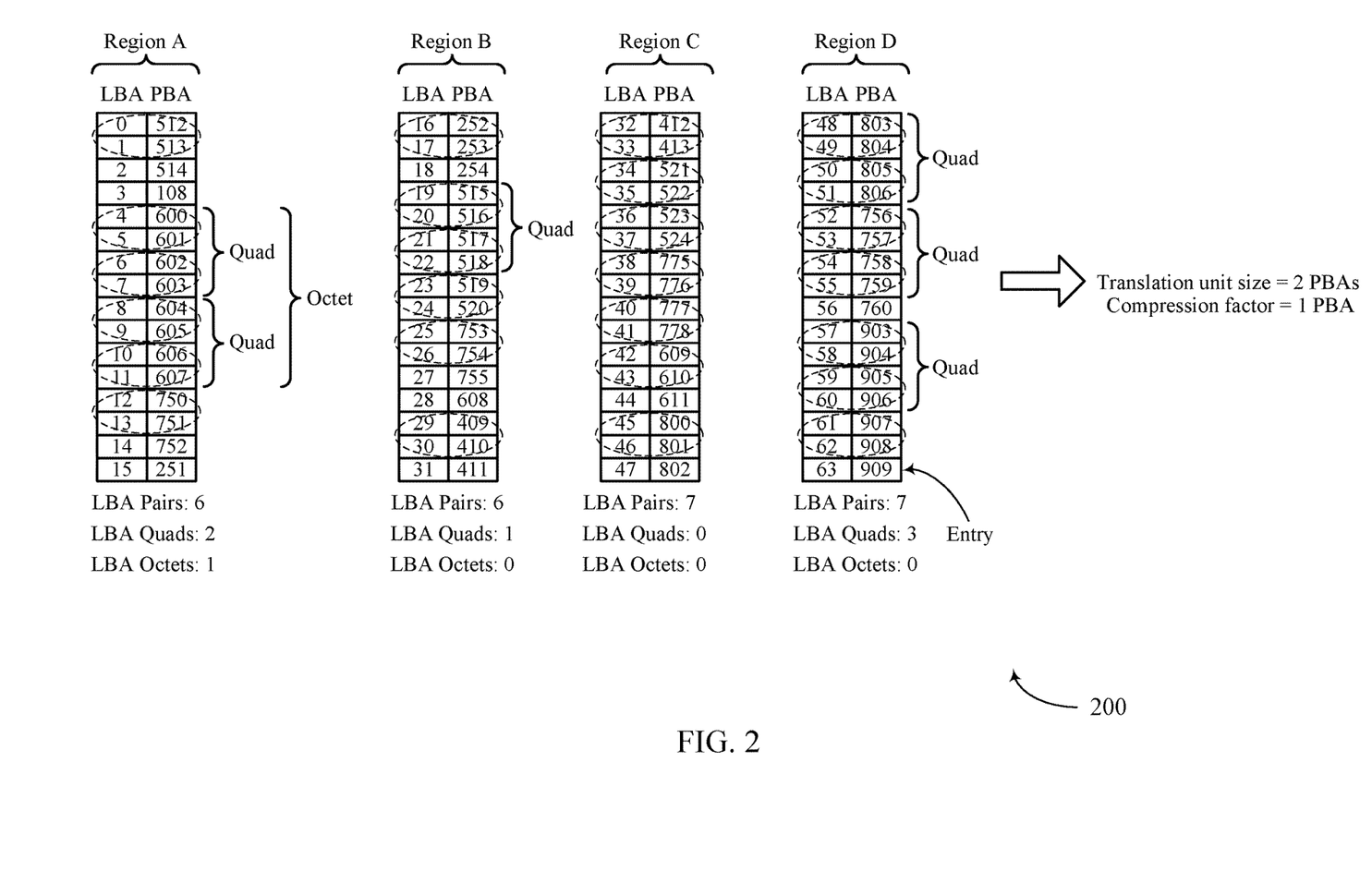
FIG. 2 illustrates an example of an address mapping table that supports compression in accordance with examples as disclosed herein.

FIG. 2 illustrates an example of an address mapping table 200 that supports compression in accordance with examples as disclosed herein. The address mapping table 200 may be an example of an L2P table of a memory system as described herein. In the example illustrated in FIG. 2, the address mapping table may be divided into regions such as region A, region B, region C, and region D. A region of an address mapping table may refer to a subset of entries corresponding to sequentially indexed logical addresses and may also be referred to as a portion or chunk of the address mapping table, among other suitable terminology. In some examples, the regions of an address mapping table may be stored in different locations of the memory system.

The memory system may compress one or more of the regions according to the techniques described herein. A compressed region of the address mapping table may include fewer physical addresses—and thus may occupy less space in memory—relative to being uncompressed but may still enable address translation by the memory system. Compressing an address mapping table may also be referred to as condensing the address mapping table, among other suitable terminology. Although described with reference to four regions, the techniques described herein may be implemented for address mapping tables that include any quantity of regions.

Initially, the regions of the address mapping table 200 may be organized according to a first translation unit size. For example, the regions of the address mapping table may be organized according to translation unit size=1 PBA such that each entry in the address mapping table 200 is associated with one logical address and one physical address. So, the address mapping table 200 may include y entries and y physical addresses, where y=64 in the illustrated example. Although each entry is shown with an associated LBA and PBA pair, in some examples, only the PBAs may be stored in the address mapping table 200 (e.g., the LBAs may be implicitly associated with the entries but not necessarily stored in the address mapping table 200).

The memory system may compress one or more of the regions of the address mapping table by selecting a new (e.g., larger) translation unit size, which in turn may be used as a basis for selecting the compression factor for the region(s). For example, the memory system may select a translation unit size of two PBAs and a compression factor of one PBA. The compression factor for a region may be based on (e.g., a function of) the translation unit size for the region. For instance, the compression factor for a region may be equal to the translation unit size for the region minus one. Upon determining the compression factor for a region, the memory system may compress the region by removing quantities of physical addresses according to (e.g., equal to) the compression factor. For example, if the translation size for the region is two PBAs and the compression factor is one PBA, the memory system may remove one PBA per pair of sequentially written LBAs. As another example, if the translation size for the region is four PBAs and the compression factor is three PBAs, the memory system may remove three PBAs per set of four sequentially written LBAs.

In general, during compression the memory system may maintain the leading (e.g., lowest indexed) PBA for a given set of sequentially written LBAs. For example, given a quad of sequentially written LBAs 4-7 mapped to PBAs 600-603, the memory system may maintain PBA 600 and remove PBAs 601-603.

The memory system may determine the translation unit size for a region by analyzing the statistics of the sequentially written sets of LBAs in the region. For example, the memory system may determine how many pairs of sequentially written LBAs (e.g., sets of two sequentially written LBAs) are included in the region, how many quads of sequentially written LBAs (e.g., sets of four sequentially written LBAs) are included in the region, and how many octets of sequentially written LBAs (e.g., sets of eight sequentially written LBAs), are included in the region. Other quantities logical addresses (e.g., 16, 32, 64, 128, 512) are contemplated and within the scope of the present disclosure. The memory system may then use this information to determine the translation unit size for the region. For example, the memory system may select a translation unit size of two PBAs based on the region having a threshold quantity of sequentially written LBA pairs or based on the pairs of sequentially written LBAs outnumbering (or exceeding by a threshold quantity) the other quantities of sequentially written LBAs.

The memory system may select the same translation unit size for each region of the address mapping table 200 or may select different translation unit sizes for the regions. For example, the memory system may select a translation unit size of two PBAs for region A, region B, region C, and region D. As another example, the memory system may select a translation unit size of two PBAs for region B and region C and may select a translation unit size of four PBAs for region A and region D.

In some examples, the memory system may perform a data relocation procedure based on (e.g., due to, in response to) the translation unit size selected for a region. For example, the memory system may perform a garbage collection procedure or a read-modify-write procedure in which data stored at one physical address is written to another physical address. The memory system may perform the data relocation procedure to increase the sets of sequentially written LBAs that have the desired quantity of logical addresses. For example, if the translation unit size for region A is two PBAs, the memory system may perform a data relocation procedure so that the data associated with LBAs 2 and 3 is re-written to sequentially indexed physical addresses (e.g., PBAs 107 and 108), thus increasing the sets of sequentially written LBA pairs from six to seven. Similarly, the memory system may perform a data relocation procedure so that the data associated with LBAs 14 and 15 is re-written to sequentially indexed physical addresses (e.g., PBAs 109 and 110), thus increasing the sets of sequentially written LBA pairs from seven to eight.

In some examples, the memory system may perform address mapping table compression for regions of the address mapping table that are associated with cold data, where cold data may refer to data that has not been written in a threshold duration. For example, if the memory system determines that threshold duration has elapsed since data associated with a region has been written, the memory system may determine that the region is associated with cold data and may initiate a compression procedure for the region. Selectively performing compression procedures on regions associated with cold data may prevent the memory system from compressing regions that are subsequently updated (which may undo the compression).

Thus, the memory system may compress the regions, which may improve the performance of the memory system.

Figure 3:
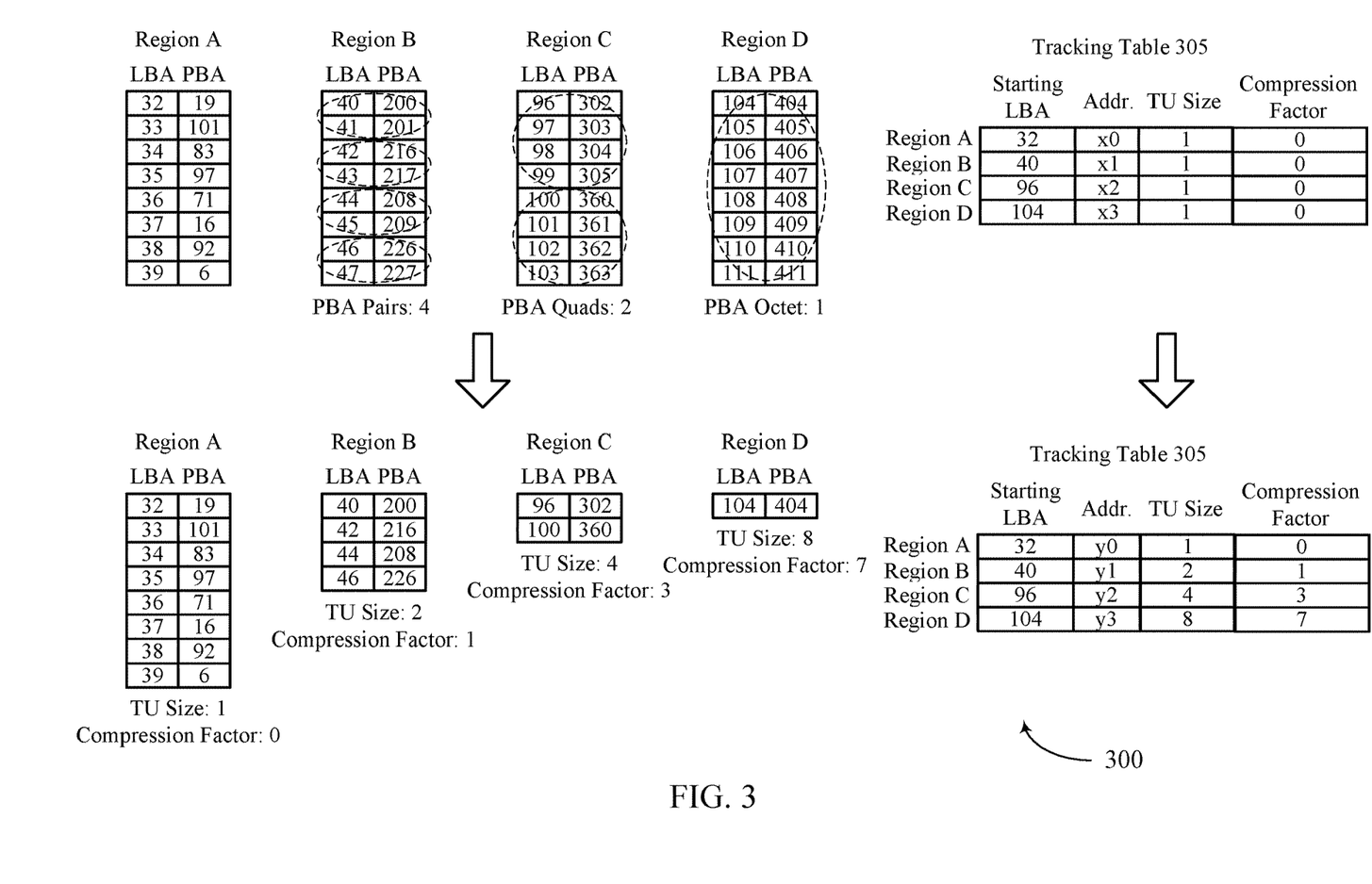
FIG. 3 illustrates an example of an address mapping table that supports compression in accordance with examples as disclosed herein.

FIG. 3 illustrates an example of an address mapping table 300 that supports compression in accordance with examples as disclosed herein. The address mapping table 300 may be an example of an L2P table of a memory system as described herein. In the example illustrated in FIG. 3, the address mapping table may be divided into regions such as region A, region B, region C, and region D. A region of an address mapping table may refer to a subset of entries corresponding to sequentially indexed logical addresses and may also be referred to as a portion or chunk of the address mapping table, among other suitable terminology. The memory system may compress the regions according to different compression factors and may update a tracking table 305 to indicate the compression.

The memory system may maintain one or more tracking tables that indicate management information for regions of the address mapping table 300. For example, the memory system may maintain tracking table 305, which may indicate the starting LBA for each region, the address location for each region, and the compression factor for each region. Initially (e.g., before compression), the tracking table 305 may indicate that the starting LBAs for region A, region B, region C, and region D are LBA 32, LBA 40, LBA 96, and LBA 104, respectively. The tracking table 305 may also indicate that the address locations of region A, region B, region C, and region D are x0, x1, x2, and x3, respectively. The tracking table 305 may also indicate that the translation unit (TU) sizes for region A, region B, region C, and region D are 0, 0, 0, and 0, respectively. And the tracking table 305 may indicate that the compression factors for region A, region B, region C, and region D are 0, 0, 0, and 0, respectively.

Although the tracking table 305 is shown with both translation unit sizes and compression factors, the tracking table 305 may include one of these metrics and may exclude the other. For example, the tracking table 305 may include translation unit sizes but not compression factors (which the memory system can derive based on the translation unit sizes e.g., by subtracting one from the translation unit sizes). As another example, the tracking table 305 may include compression factors but not translation unit sizes (which the memory system can derive based on the compression factors e.g., by adding one to the compression factors). After compressing one or more of the regions, the memory system may update the tracking table 305 with updated information for the address mapping table 300.

To compress the address mapping table 300, the memory system may identify sets of sequentially written LBAs for each region of the address mapping table 300. Accordingly, the memory system may determine that region A has no sets of sequentially written LBAs. The memory system may also determine that region B has four sets of two sequentially written LBAs (e.g., four sets of sequentially written LBA pairs). The memory system may also determine that region C has two sets of four sequentially written LBAs (e.g., two sets of sequentially written LBA quads). And the memory system may determine that region D has one set of eight sequentially written LBAs (e.g., one set of sequentially written LBA octets).

The memory system may select translation unit sizes, and thus compression factors, for the regions based on (e.g., as a function of) the sets of sequentially written LBAs for each region. For example, the memory system may select a translation unit size of one PBA for region A based on region A having no sets of sequentially written LBAs. Accordingly, the memory system may select a compression factor of 0 PBAs for region A (which indicates that 0 physical address can be removed from region A).

As another example, the memory system may select a translation unit size of two PBAs for region B based on region B having four sets of sequentially written LBA pairs. Accordingly, the memory system may select a compression factor of one PBA for region B (which indicates that one physical address can be removed per set of sequentially written LBAs). As another example, the memory system may select a translation unit size of four PBAs for region C based on region C having two sets of sequentially written LBA quads. Accordingly, the memory system may select a compression factor of three PBAs for region C (which indicates that three physical address can be removed per set of sequentially written LBAs). As another example, the memory system may select a translation unit size of eight PBAs for region D based on region D having one set of sequentially written LBA octets. Accordingly, the memory system may select a compression factor of seven for region D (which indicates that seven physical address can be removed per set of sequentially written LBAs).

The memory system may compress some or all of the regions according to the compression factor for that region. For example, the memory system may compress region B according to the compression factor of one PBA, may compress region C according to the compression factor of three PBAs, and may compress region D according to the compression factor of seven PBAs. Compression of a region according to a compression factor may involve the removal of a subset of physical addresses (equal to the compression factor) from the region. For example, the memory system may remove a subset of physical addresses from each set of sequentially indexed physical addresses associated with a set of sequentially written LBAs.

As an illustration, the memory system may compress region B by removing one physical address per pair of sequentially written LBAs. However, the memory system may maintain the leading (e.g., lowest-indexed) physical address per pair of sequentially written LBAs. Thus, the memory system may remove PBA 201 from the pair of LBAs that includes LBA 40 and 41 and may maintain PBA 200 Similarly, the memory system may remove PBA 217 from the pair of LBAs that includes LBA 42 and 43. And so on and so forth as illustrated.

After compressing the regions of the address mapping table 300, the memory system may update tracking table 305 to reflect the new organization of the regions. For example, the memory system may update the tracking table 305 to indicate the new starting addresses for the regions (if the starting addresses are modified as part of the compression). For example, the memory system may update the tracking table 305 to indicate that the starting address for region A is y0, the starting address for region B is y1, the starting address for region C is y2, and the starting address for region D is y3. The memory system may also update the tracking table 305 to indicate that new compression factors for the regions (if the compression factors are modified). For example, the memory system may update the tracking table 305 to indicate that the compression factor for region B is one PBA, the compression factor for region C is three PBAs, and the compression factor for region D is seven PBAs.

Additionally or alternatively, the memory system may update the tracking table 305 to indicate the translation unit sizes for the regions. For example, the memory system may update the tracking table 305 to indicate that the translation unit size for region B is two PBAs, the translation unit size for region C is four PBAs, and the translation unit size for region D is eight PBAs.

The memory system may use the information in the tracking table 305 to use and, if needed, decompress the regions. To use a compressed region for address translation of a logical address (e.g., LBA 101), the memory system may reference the tracking table 305 to determine the address of the region (e.g., region C) associated with the logical address. The memory system may then read the region based on the address to determine the physical address (e.g., 360) mapped to the LBA (e.g., LBA 100) that is closest to the logical address undergoing address translation. The memory system may then use the TU size (or compression factor) for the region to determine the physical address (e.g., PBA 361) mapped to the logical address (e.g., LBA 101) undergoing address translation.

Thus, the memory system may compress the regions according to different compression factors and may update the tracking table 305 to indicate the compression.

Figure 4:
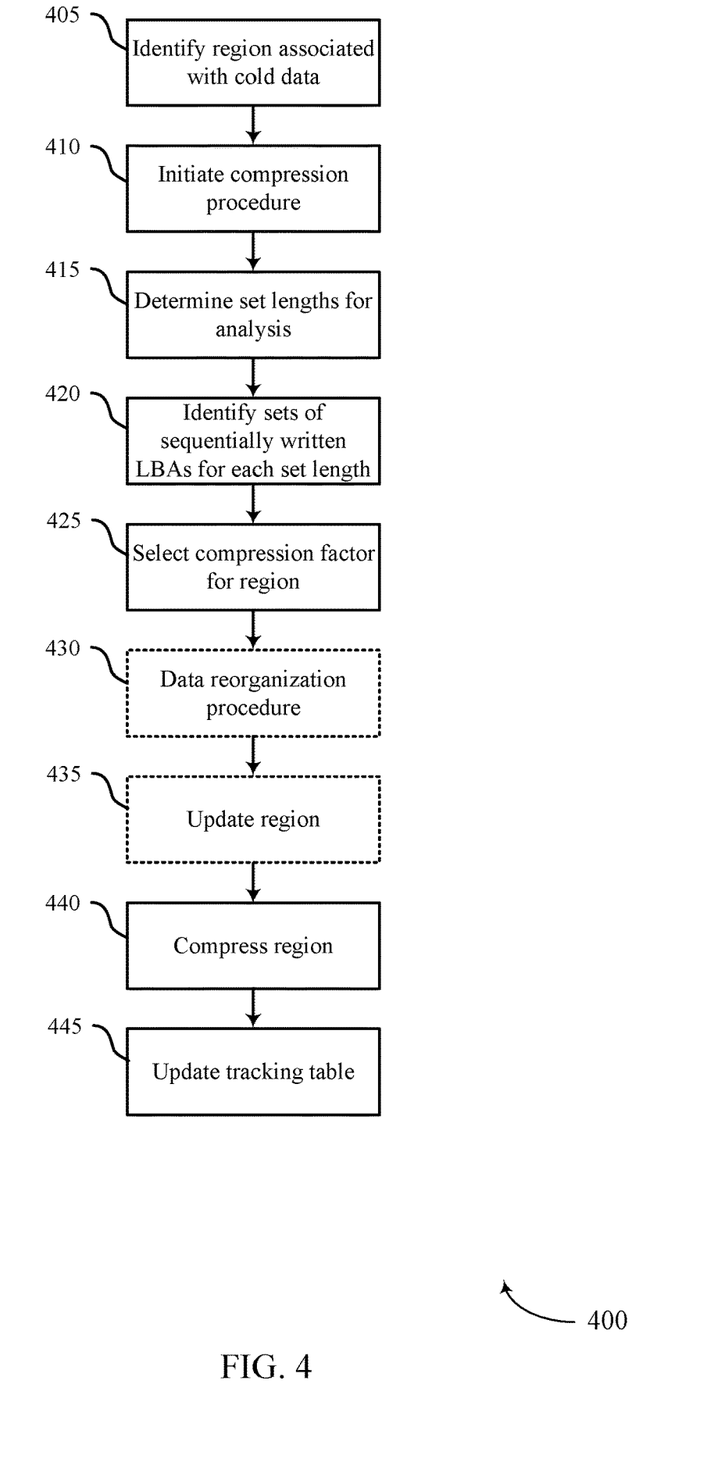
FIG. 4 illustrates an example of a process flow that supports address mapping table compression in accordance with examples as disclosed herein.

FIG. 4 illustrates an example of a process flow 400 that supports address mapping table compression in accordance with examples as disclosed herein. The process flow 400 may be implemented by a memory system such as the memory system 110 described with reference to FIG. 1. By implementing the process flow 400, the memory system may compression one or more regions of an address mapping table, which may improve the performance of the memory system.

Aspects of the process flow 400 may be implemented by a controller, among other components. Additionally or alternatively, aspects of the process flow 400 may be implemented as instructions stored in memory (e.g., firmware stored in a memory coupled with a memory system). For example, the instructions, if executed by a controller (e.g., the memory system controller 115), may cause the controller to perform the operations of the process flow 400.

At 405, a region of an address mapping table that is associated with cold data may be identified. For example, the memory system may determine that a threshold duration has elapsed since the data associated with a region of the address mapping table was last (e.g., most recently) written. At 410, a compression procedure may be initiated for the region based on (e.g., in response to) the region being associated with cold data.

At 415, set lengths for analysis may be determined, where a set length may refer to the quantity of logical addresses in a set of sequentially written logical addresses. For example, the memory system may determine to check for sets of sequentially written logical addresses with set lengths equal to two, four, and eight. At 420, sets of sequentially written logical addresses may be identified for each set length. For example, the memory system may determine (e.g., count) the sets of sequentially written logical addresses for each set length. As an illustration, the memory system may determine that there are x sets of sequentially written logical addresses with a set length of two (e.g., two LBAs), that there are y sets of sequentially written logical addresses with a set length of four (e.g., four LBAs), and that there are z sets of sequentially written logical addresses with a set length of eight (e.g., eight LBAs).

At 425, a compression factor for the region based be selected. For example, the memory system may select a compression factor for the region based on (e.g., as a function of) the sets of sequentially written logical addresses. As an illustration, the memory system may select a compression factor of one PBA (corresponding to a translation unit size of two PBAs) based on the sets of two sequentially written LBAs exceeding a threshold, based on the sets of sequentially written LBAs for other set lengths being less than one or more thresholds, or both. As another illustration, the memory system may select a compression factor of one PBA based on the sets of two sequentially written LBAs including a higher total quantity of LBAs than the sets of sequentially written LBAs for other set lengths. As another illustration, the memory system may select a compression factor of one PBA based on the sets of two sequentially written LBAs being associated with a larger amount of data than the sets of sequentially written LBAs for other set lengths. As another illustration, the memory system may select a compression factor of one PBA based on the sets of two sequentially written LBAs covering a larger portion of the region than the sets of sequentially written LBAs for other set lengths.

At 430, a data relocation procedure (e.g., a garbage collection procedure, a wear-leveling procedure, a read-modify-write procedure) may be performed based on compression factor. For example, the memory system may perform a data relocation procedure to re-locate at least some data associated with the region so that additional sets of sequentially written LBAs (in accordance with the translation unit size) are created. At 435, the region may be updated to reflect the new physical addresses of the data subjected to the data relocation procedure.

At 440, the region may be compressed. For example, the memory system may compress the region by removing at least some physical addresses from the region. In some examples, the memory system may remove subsets of physical addresses from the sets of physical addresses associated with the sets of sequentially written logical addresses. In such examples, the quantity of physical addresses removed from each set of physical addresses may be based on the tracking unit size (e.g., equal to the tracking unit size minus one) or based on the compression factor (e.g., equal to the compression factor). The memory system may maintain the leading (e.g., lowest-indexed) physical address in each set of physical addresses.

At 445, the tracking table associated with the region may be updated based on (e.g., in response to) compressing the region. For example, the memory system may update the tracking table to indicate the new address location for the region (if address location was changed during 435 or 440). Additionally or alternatively, the memory system may update the tracking table to indicate the translation unit size for the region, the compression factor for the region, or both.

Thus, the memory system compress a region of an address mapping table, which may improve the performance of the memory system. Alternative examples of the foregoing may be implemented, where some operations are performed in a different order than described, are performed in parallel, or are not performed at all. In some cases, operations may include additional features not mentioned herein, or further operations may be added. Additionally, certain operations may be performed multiple times or certain combinations of operations may repeat or cycle.

Figure 5:
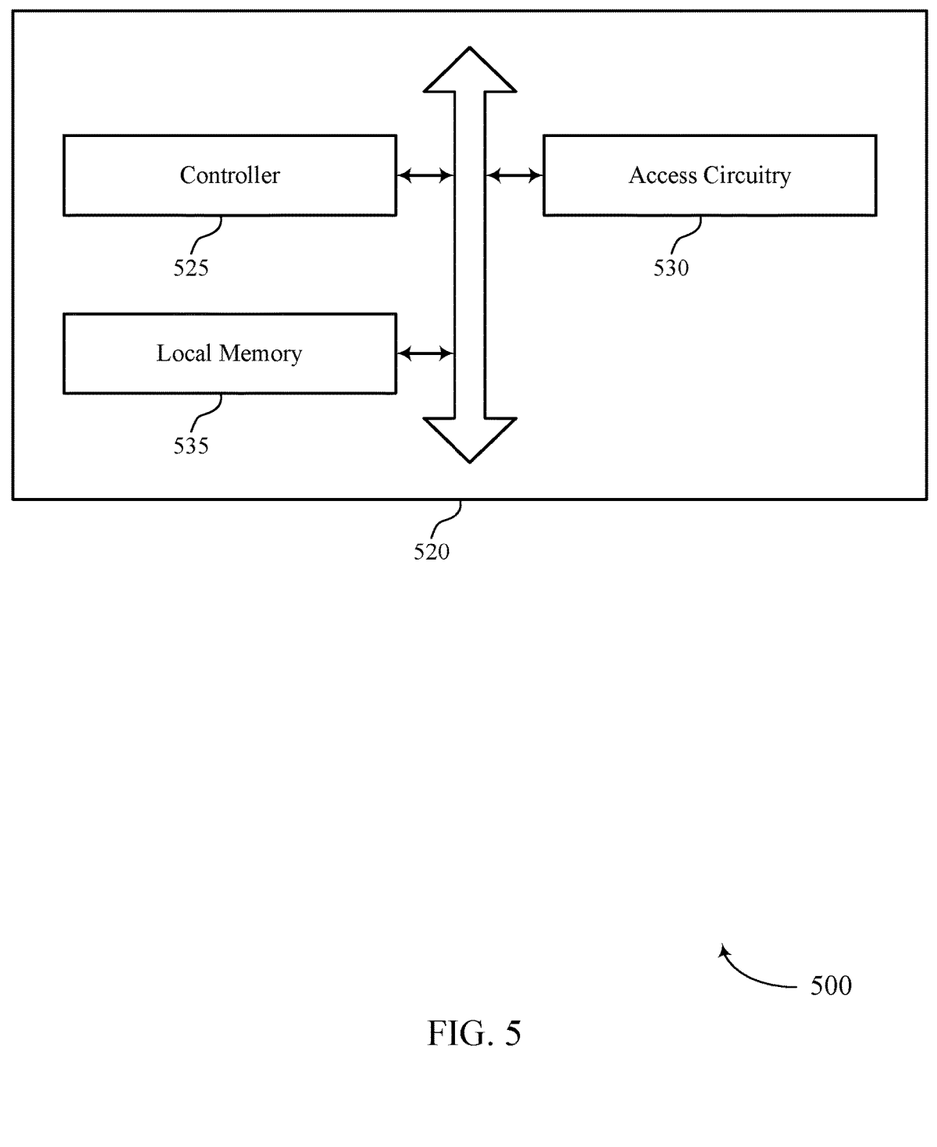
FIG. 5 illustrates a block diagram of a memory system that supports address mapping table compression in accordance with examples as disclosed herein.

FIG. 5 illustrates a block diagram 500 of a memory system 520 that supports address mapping table compression in accordance with examples as disclosed herein. The memory system 520 may be an example of aspects of a memory system as described with reference to FIGS. 1 through 4. The memory system 520, or various components thereof, may be an example of means for performing various aspects of address mapping table compression as described herein. For example, the memory system 520 may include a controller 525, an access circuitry 530, a local memory 535, or any combination thereof. Each of these components may communicate, directly or indirectly, with one another (e.g., via one or more buses).

The controller 525 may be configured as or otherwise support a means for determining, for a region of an address mapping table that includes physical addresses and that indicates mappings between the physical addresses and logical addresses, sets of sequentially indexed logical addresses that are mapped to sets of sequentially indexed physical addresses. In some examples, the controller 525 may be configured as or otherwise support a means for selecting a compression factor for the region based at least in part on the sets of sequentially indexed logical addresses, the compression factor indicating a quantity of physical addresses to be removed per set of sequentially indexed physical addresses. The access circuitry 530 may be configured as or otherwise support a means for removing subsets of physical addresses from the sets of sequentially indexed physical addresses in the region according to the compression factor.

In some examples, the controller 525 may be configured as or otherwise support a means for determining whether the region of the address mapping table is associated with data that has not been written for a threshold duration, where the sets of sequentially indexed logical addresses are determined based at least in part on the region of the address mapping table being associated with data that has not been written for the threshold duration.

In some examples, each subset of physical addresses includes a quantity of physical addresses equal to the quantity of physical addresses indicated by the compression factor.

In some examples, the local memory 535 may be configured as or otherwise support a means for updating a tracking table to indicate the compression factor for the region, the tracking table including an address location of the region and a lowest-indexed logical address mapped by the region.

In some examples, the access circuitry 530 may be configured as or otherwise support a means for performing a data relocation procedure to increase the sets of sequentially indexed logical addresses mapped to sequentially indexed physical addresses based at least in part on determining at least one set of sequentially indexed logical addresses that is mapped to non-sequentially indexed physical addresses.

In some examples, each set of sequentially indexed logical addresses has a same quantity of logical addresses. In some examples, the quantity of physical addresses to be removed per set is based at least in part on the quantity of logical addresses.

In some examples, the controller 525 may be configured as or otherwise support a means for determining, for the region, additional sets of sequentially indexed logical addresses that are mapped to additional sets of sequentially indexed physical addresses and that have a different quantity of logical addresses than the sets of sequentially indexed logical addresses, where the compression factor for the region is selected based at least in part on the additional sets of sequentially indexed logical addresses.

In some examples, the access circuitry 530 may be configured as or otherwise support a means for maintaining, for each set of sequentially indexed logical addresses in the region, a lowest-indexed physical address associated with the set of sequentially indexed logical addresses.

In some examples, the sets of sequentially indexed logical addresses include sets of two sequentially indexed addresses and sets of four sequentially indexed addresses, and the controller 525 may be configured as or otherwise support a means for determining that the sets of two sequentially indexed logical addresses include a higher total quantity of logical address than the sets of four sequentially indexed logical addresses, where the compression factor for the region is selected based at least in part on the determination.

Figure 6:
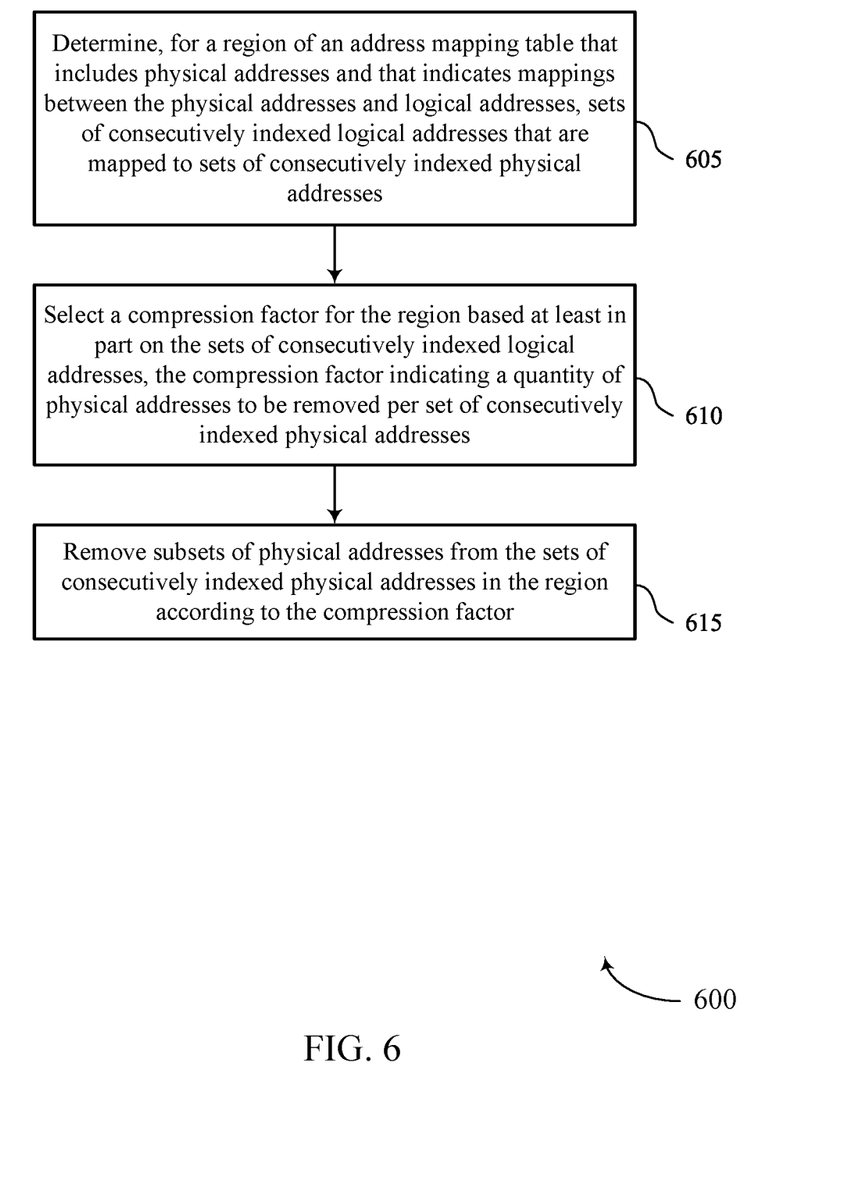
FIG. 6 illustrates a flowchart showing a method or methods that support address mapping table compression in accordance with examples as disclosed herein.

FIG. 6 illustrates a flowchart showing a method 600 that supports address mapping table compression in accordance with examples as disclosed herein. The operations of method 600 may be implemented by a memory system or its components as described herein. For example, the operations of method 600 may be performed by a memory system as described with reference to FIGS. 1 through 5. In some examples, a memory system may execute a set of instructions to control the functional elements of the device to perform the described functions. Additionally, or alternatively, the memory system may perform aspects of the described functions using special-purpose hardware.

At 605, the method may include determining, for a region of an address mapping table that includes physical addresses and that indicates mappings between the physical addresses and logical addresses, sets of sequentially indexed logical addresses that are mapped to sets of sequentially indexed physical addresses. The operations of 605 may be performed in accordance with examples as disclosed herein. In some examples, aspects of the operations of 605 may be performed by a controller 525 as described with reference to FIG. 5.

At 610, the method may include selecting a compression factor for the region based at least in part on the sets of sequentially indexed logical addresses, the compression factor indicating a quantity of physical addresses to be removed per set of sequentially indexed physical addresses. The operations of 610 may be performed in accordance with examples as disclosed herein. In some examples, aspects of the operations of 610 may be performed by a controller 525 as described with reference to FIG. 5.

At 615, the method may include removing subsets of physical addresses from the sets of sequentially indexed physical addresses in the region according to the compression factor. The operations of 615 may be performed in accordance with examples as disclosed herein. In some examples, aspects of the operations of 615 may be performed by an access circuitry 530 as described with reference to FIG. 5.

In some examples, an apparatus as described herein may perform a method or methods, such as the method 600. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for determining, for a region of an address mapping table that includes physical addresses and that indicates mappings between the physical addresses and logical addresses, sets of sequentially indexed logical addresses that are mapped to sets of sequentially indexed physical addresses; selecting a compression factor for the region based at least in part on the sets of sequentially indexed logical addresses, the compression factor indicating a quantity of physical addresses to be removed per set of sequentially indexed physical addresses; and removing subsets of physical addresses from the sets of sequentially indexed physical addresses in the region according to the compression factor.

Aspect 2: The method, apparatus, or non-transitory computer-readable medium of aspect 1, further including operations, features, circuitry, logic, means, or instructions, or any combination thereof for determining whether the region of the address mapping table is associated with data that has not been written for a threshold duration, where the sets of sequentially indexed logical addresses are determined based at least in part on the region of the address mapping table being associated with data that has not been written for the threshold duration.

Aspect 3: The method, apparatus, or non-transitory computer-readable medium of any of aspects 1 through 2, where each subset of physical addresses includes a quantity of physical addresses equal to the quantity of physical addresses indicated by the compression factor.

Aspect 4: The method, apparatus, or non-transitory computer-readable medium of any of aspects 1 through 3, further including operations, features, circuitry, logic, means, or instructions, or any combination thereof for updating a tracking table to indicate the compression factor for the region, the tracking table including an address location of the region and a lowest-indexed logical address mapped by the region.

Aspect 5: The method, apparatus, or non-transitory computer-readable medium of any of aspects 1 through 4, further including operations, features, circuitry, logic, means, or instructions, or any combination thereof for performing a data relocation procedure to increase the sets of sequentially indexed logical addresses mapped to sequentially indexed physical addresses based at least in part on determining at least one set of sequentially indexed logical addresses that is mapped to non-sequentially indexed physical addresses.

Aspect 6: The method, apparatus, or non-transitory computer-readable medium of any of aspects 1 through 5, where each set of sequentially indexed logical addresses has a same quantity of logical addresses and the quantity of physical addresses to be removed per set is based at least in part on the quantity of logical addresses.

Aspect 7: The method, apparatus, or non-transitory computer-readable medium of any of aspects 1 through 6, further including operations, features, circuitry, logic, means, or instructions, or any combination thereof for determining, for the region, additional sets of sequentially indexed logical addresses that are mapped to additional sets of sequentially indexed physical addresses and that have a different quantity of logical addresses than the sets of sequentially indexed logical addresses, where the compression factor for the region is selected based at least in part on the additional sets of sequentially indexed logical addresses.

Aspect 8: The method, apparatus, or non-transitory computer-readable medium of any of aspects 1 through 7, further including operations, features, circuitry, logic, means, or instructions, or any combination thereof for maintaining, for each set of sequentially indexed logical addresses in the region, a lowest-indexed physical address associated with the set of sequentially indexed logical addresses.

Aspect 9: The method, apparatus, or non-transitory computer-readable medium of any of aspects 1 through 8, where the sets of sequentially indexed logical addresses include sets of two sequentially indexed addresses and sets of four sequentially indexed addresses and the method, apparatuses, and non-transitory computer-readable medium further includes operations, features, circuitry, logic, means, or instructions, or any combination thereof for determining that the sets of two sequentially indexed logical addresses include a higher total quantity of logical address than the sets of four sequentially indexed logical addresses, where the compression factor for the region is selected based at least in part on the determination.

It should be noted that the described techniques include possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, or symbols of signaling that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" (e.g., "electrically coupling") may refer to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

As used herein, the term "substantially" means that the modified characteristic (e.g., a verb or adjective modified by the term substantially) need not be absolute but is close enough to achieve the advantages of the characteristic.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally, or alternatively (e.g., in an alternative example), be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, the described functions can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
   one or more memory devices; and
   a controller coupled with the one or more memory devices and configured to cause the apparatus to:
      determine, for a region of an address mapping table that comprises physical addresses and that indicates mappings between the physical addresses and logical addresses, sets of sequentially indexed logical addresses that are mapped to sets of sequentially indexed physical addresses;
      select a compression factor for the region based at least in part on the sets of sequentially indexed logical addresses, the compression factor indicating a quantity of physical addresses to be removed per set of sequentially indexed physical addresses; and
      remove subsets of physical addresses from the sets of sequentially indexed physical addresses in the region according to the compression factor.

2. The apparatus of claim 1, wherein the controller is further configured to cause the apparatus to:
   determine whether the region of the address mapping table is associated with data that has not been written for a threshold duration, wherein the sets of sequentially indexed logical addresses are determined based at least in part on the region of the address mapping table being associated with data that has not been written for the threshold duration.

3. The apparatus of claim 1, wherein each subset of physical addresses comprises a quantity of physical addresses equal to the quantity of physical addresses indicated by the compression factor.

4. The apparatus of claim 1, wherein the controller is further configured to cause the apparatus to:
   update a tracking table to indicate the compression factor for the region, the tracking table comprising an address location of the region and a lowest-indexed logical address mapped by the region.

5. The apparatus of claim 1, wherein the controller is further configured to cause the apparatus to:
   perform a data relocation procedure to increase the sets of sequentially indexed logical addresses mapped to sequentially indexed physical addresses based at least in part on determining at least one set of sequentially indexed logical addresses that is mapped to non-sequentially indexed physical addresses.

6. The apparatus of claim 1, wherein each set of sequentially indexed logical addresses has a same quantity of logical addresses, and wherein the quantity of physical addresses to be removed per set is based at least in part on the quantity of logical addresses.

7. The apparatus of claim 1, wherein the controller is further configured to cause the apparatus to:
   determine, for the region, additional sets of sequentially indexed logical addresses that are mapped to additional sets of sequentially indexed physical addresses and that have a different quantity of logical addresses than the sets of sequentially indexed logical addresses, wherein the compression factor for the region is selected based at least in part on the additional sets of sequentially indexed logical addresses.

8. The apparatus of claim 1, wherein the controller is further configured to cause the apparatus to:
   maintain, for each set of sequentially indexed logical addresses in the region, a lowest-indexed physical address associated with the set of sequentially indexed logical addresses.

9. The apparatus of claim 1, wherein the sets of sequentially indexed logical addresses comprise sets of two sequentially indexed addresses and sets of four sequentially indexed addresses, and wherein the controller is further configured to cause the apparatus to:
   determine that the sets of two sequentially indexed logical addresses comprise a higher total quantity of logical address than the sets of four sequentially indexed logical addresses, wherein the compression factor for the region is selected based at least in part on the determination.

10. A method, comprising:
   determining, for a region of an address mapping table that comprises physical addresses and that indicates mappings between the physical addresses and logical addresses, sets of sequentially indexed logical addresses that are mapped to sets of sequentially indexed physical addresses;

selecting a compression factor for the region based at least in part on the sets of sequentially indexed logical addresses, the compression factor indicating a quantity of physical addresses to be removed per set of sequentially indexed physical addresses; and removing subsets of physical addresses from the sets of sequentially indexed physical addresses in the region according to the compression factor.

11. The method of claim 10, further comprising:

determining whether the region of the address mapping table is associated with data that has not been written for a threshold duration, wherein the sets of sequentially indexed logical addresses are determined based at least in part on the region of the address mapping table being associated with data that has not been written for the threshold duration.

12. The method of claim 10, wherein each subset of physical addresses comprises a quantity of physical addresses equal to the quantity of physical addresses indicated by the compression factor.

13. The method of claim 10, further comprising:

updating a tracking table to indicate the compression factor for the region, the tracking table comprising an address location of the region and a lowest-indexed logical address mapped by the region.

14. The method of claim 10, further comprising:

performing a data relocation procedure to increase the sets of sequentially indexed logical addresses mapped to sequentially indexed physical addresses based at least in part on determining at least one set of sequentially indexed logical addresses that is mapped to non-sequentially indexed physical addresses.

15. The method of claim 10, wherein each set of sequentially indexed logical addresses has a same quantity of logical addresses, and wherein the quantity of physical addresses to be removed per set is based at least in part on the quantity of logical addresses.

16. The method of claim 10, further comprising:

determining, for the region, additional sets of sequentially indexed logical addresses that are mapped to additional sets of sequentially indexed physical addresses and that have a different quantity of logical addresses than the sets of sequentially indexed logical addresses, wherein the compression factor for the region is selected based at least in part on the additional sets of sequentially indexed logical addresses.

17. The method of claim 10, further comprising:

maintaining, for each set of sequentially indexed logical addresses in the region, a lowest-indexed physical address associated with the set of sequentially indexed logical addresses.

18. The method of claim 10, wherein the sets of sequentially indexed logical addresses comprise sets of two sequentially indexed addresses and sets of four sequentially indexed addresses, the method further comprising:

determining that the sets of two sequentially indexed logical addresses comprise a higher total quantity of logical address than the sets of four sequentially indexed logical addresses, wherein the compression factor for the region is selected based at least in part on the determination.

19. A non-transitory computer-readable medium storing code, the code comprising instructions executable by a processor to:

determine, for a region of an address mapping table that comprises physical addresses and that indicates mappings between the physical addresses and logical addresses, sets of sequentially indexed logical addresses that are mapped to sets of sequentially indexed physical addresses;

select a compression factor for the region based at least in part on the sets of sequentially indexed logical addresses, the compression factor indicating a quantity of physical addresses to be removed per set of sequentially indexed physical addresses; and remove subsets of physical addresses from the sets of sequentially indexed physical addresses in the region according to the compression factor.

20. The non-transitory computer-readable medium of claim 19, wherein the instructions are further executable by the processor to:

determine whether the region of the address mapping table is associated with data that has not been written for a threshold duration, wherein the sets of sequentially indexed logical addresses are determined based at least in part on the region of the address mapping table being associated with data that has not been written for the threshold duration.

* * * * *